Sept. 1, 1931.     J. H. REINHARDT     1,821,360
PAGE NUMBERING MACHINE
Filed Aug. 12, 1926     4 Sheets-Sheet 1
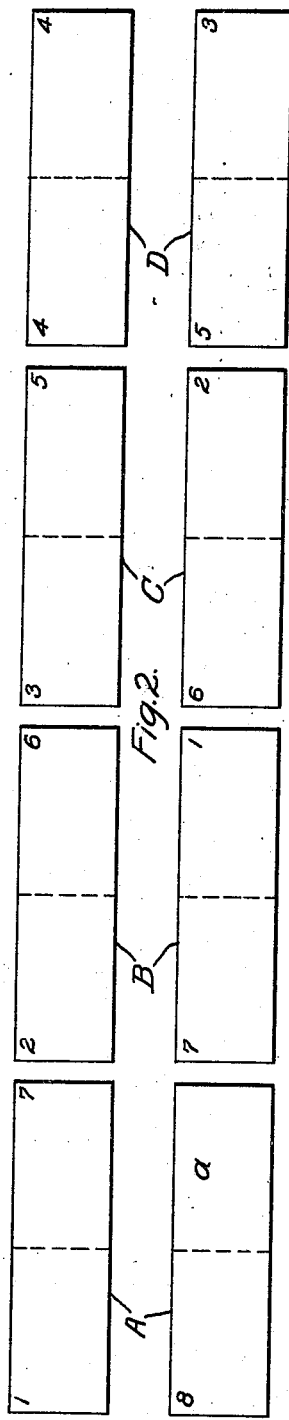
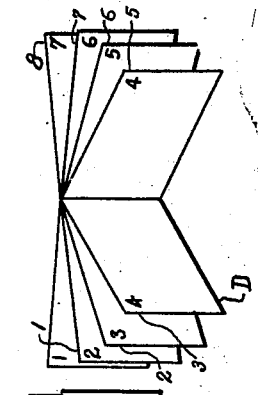
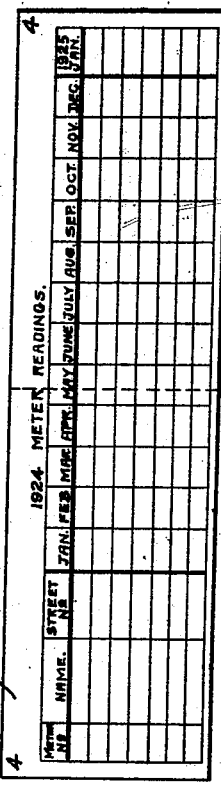
INVENTOR.
J. H. Reinhardt
BY
T. F. Bourne
ATTORNEY

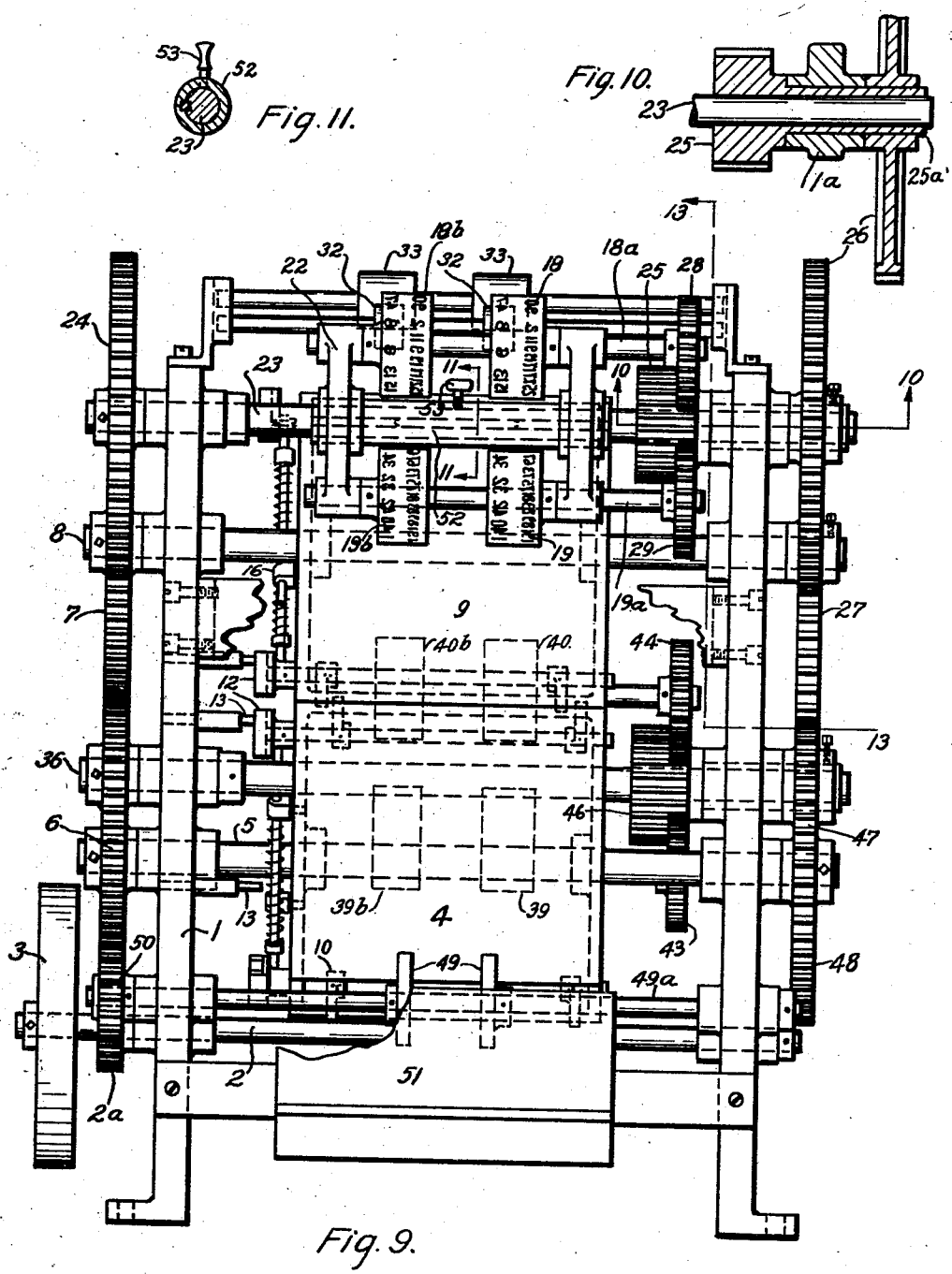

Sept. 1, 1931.  J. H. REINHARDT  1,821,360
PAGE NUMBERING MACHINE
Filed Aug. 12, 1926   4 Sheets-Sheet 3

INVENTOR
J. H. Reinhardt
BY
T. F. Bourne
ATTORNEY

Sept. 1, 1931.  J. H. REINHARDT  1,821,360

PAGE NUMBERING MACHINE

Filed Aug. 12, 1926  4 Sheets-Sheet 4

INVENTOR
J. H. Reinhardt
BY
P. E. Bourne
ATTORNEY

Patented Sept. 1, 1931

1,821,360

UNITED STATES PATENT OFFICE

JAMES H. REINHARDT, OF EAST ORANGE, NEW JERSEY

PAGE NUMBERING MACHINE

Application filed August 12, 1926. Serial No. 128,780.

In some classes of books the pages that face each other are given the same page number, instead of consecutive numbers. For instance, two pages facing each other each bear the number one, the next two pages facing each other bear the number two, and so on throughout the book. The books are usually made from a number of signatures bound together and each signature contains a given number of pages numbered in the manner stated. Such books are used for various purposes, such as by utility and insurance companies and others for keeping special records. Heretofore, so far as I am aware, the pages of the different signatures have been numbered when the pages are being printed, and as the last page of a signature will bear the same number as the first page of a succeeding signature it has been necessary to have all the signatures printed and individually bound before they can be assembled and bound together in book form.

The object of my invention is to print the appropriate numbers on opposite sides of sheets for signatures in such a way that when the leaves of the signatures are bound together the page numbers facing each other will be the same and whereby the number of the last page of a signature will be the same as the number on the first page of a succeeding signature, so that each signature may be bound as soon as the sheets for it are numbered.

In carrying out my invention I provide printing or numbering wheels having type to print the page numbers on the leaves of the signatures, and impression cylinders to cooperate with said printing or numbering wheels, with means for causing bodily and axial rotation of the numbering wheels in such a way that when the leaves for the signatures pass between the numbering wheels and the impression cylinders the appropriate numbers will be printed adjacent to the corners of the leaves, on both sides thereof, in such a way that when the signatures are assembled opposing pages will bear the same numbers. By the means described each sheet may comprise four pages which, when bound, will produce two leaves in the signature, as distinguished from printing a sheet containing, say, eight pages to be properly positioned when folded, as well known in the book maker's art. The printed matter for the pages may be printed on a sheet and then the latter may be cut to required shape for each pair of connecting leaves for the book and then the page numbering may proceed, or the numbering of the pages may be printed first on the cut sheets and then the printed matter for the pages may be printed afterward.

My invention comprises novel details of improvement that will be more fully hereinafter set forth and then pointed out in the claims.

Reference is to be had to the accompanying drawings forming a part hereof, wherein Fig. 1 is a face view illustrating four sheets for a signature, each page numbered according to my invention;

Fig. 2 is a similar view on opposite sides of said sheets;

Figs. 3, 4, 5 and 6 illustrate perspective views of the signatures made from said sheets showing the leaves in different positions to indicate similar page numbering on opposing pages;

Figure 12:
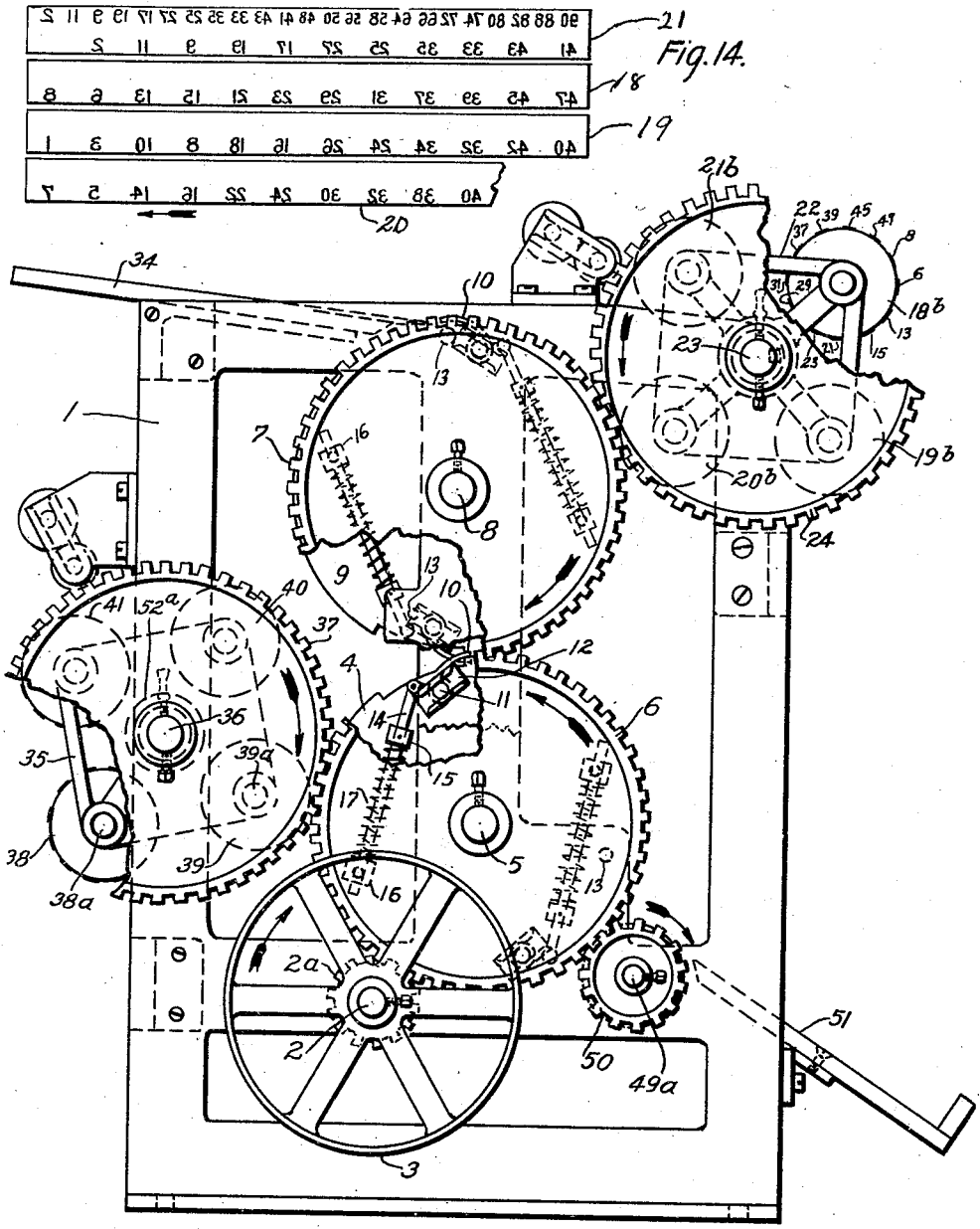
Figure 15:
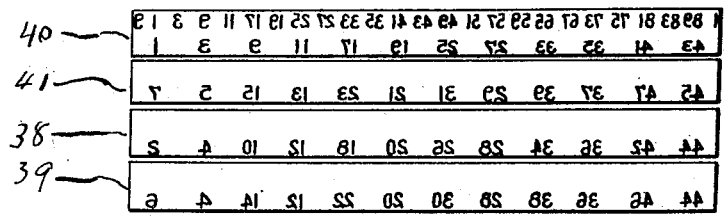
Figure 13:
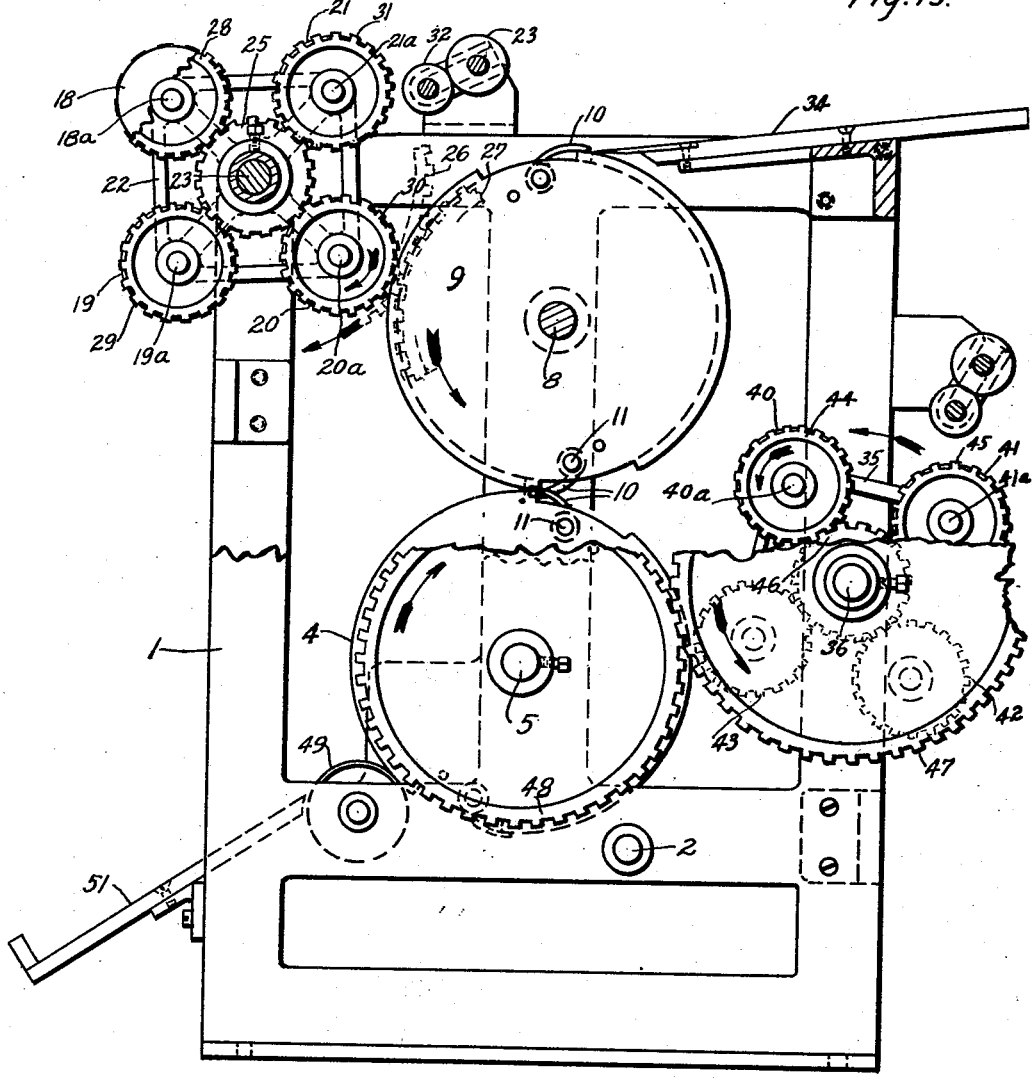

Fig. 7 indicates a similar signature having succeeding page numbers;

Fig. 8 indicates a printed sheet;

Fig. 9 is a front elevation of a numbering machine embodying my invention;

Fig. 10 is a detail section on line 10, 10, in Fig. 9;

Fig. 11 is a detail cross section on line 11, 11, in Fig. 9;

Fig. 12 is a partly broken side elevation looking from the left side of Fig. 9;

Fig. 13 is a side elevation partly in section substantially on the line 13, 13, in Fig. 9; and Figs. 14 and 15 indicate developments of printing or numbering wheels.

Similar numerals of reference indicate corresponding parts in the several views.

The sheets A, B, C, D, in Fig. 1, represent sheets for the signatures represented in Figs. 3, 4, 5 and 6 when said sheets are attached together in a usual way at the center. In Fig. 1 the front face of sheet A in one corner bears the numeral 8 and the opposite corner has no numeral because for a four sheet signature the page *a* will be the front page of the first signature of a bound book, assuming that there are several signatures bound together in book form. The sheets B, C, D in Fig. 1 have different page numbers in their corners. In Fig. 2 the corners of the sheets A, B, C have different page numerals, whereas sheet D has similar numerals at its corners to represent page 4 of the bound signature or book. When the four sheets are bound together in a signature, as in Figs. 3, 4, 5 and 6, the sheets will be bound up in the order of A, B, C, D, A being at the back, and the opposing pages will be correspondingly numbered, thus, the first two inside pages facing each other will each bear the page numeral 1, facing each other, (Fig. 3); the next facing pages will bear the numerals 2 facing each other, (Fig. 4); the next pages will bear the numerals 3 facing each other, (Fig. 5), and the middle pages of sheet D will have the numerals 4 facing each other, (Fig. 6). The back or outer page of sheet A, in the signature, will have the blank page *a* on its front face, (Fig. 3), and the numeral 8 of sheet A will be on the other corresponding back page of the signature, (Fig. 6), which will face numeral 8 on the front page of sheet E of the next signature of the book, as indicated in Fig. 7, the pages numbered 9, 9, facing each other, and so on consecutively, Fig. 7 illustrating the middle pages 12 correspondingly numbered facing each other on sheet H. The same arrangement will be carried out for all signatures for a bound book. While I have illustrated four sheets for a signature there may be any desired number of sheets in the signature. The arrangement of the numbering wheels in Figs. 9 to 14 is for numbering eight pages or four sheets for a signature.

Referring to Figs. 9 to 14 the numeral 1 indicates any suitable frame for the machine, shown provided with a driving shaft 2 suitably journaled in the frame and which may be driven by any suitable means, such as by pulley 3 on said shaft receiving a drive belt from any suitable source of power. A printing cylinder is indicated at 4 carried by shaft 5 journaled in the main frame, which shaft is provided with a gear 6 in mesh with pinion 2*a* on shaft 2. The gear 6 is in mesh with a gear 7 of corresponding diameter secured on shaft 8 journaled in the main frame, a second printing cylinder 9 being secured on said shaft. By the means described both printing cylinders are driven at the same peripheral speed in opposite directions. Any suitable means may be provided for gripping the sheets to be numbered to carry them in printing position around the surfaces of the corresponding printing cylinders. The printing cylinders illustrated are of such diameter respecting the length of the sheets A, B, C, etc. that two sheets will be printed with numbers in their corners for each single rotation of each printing cylinder. I have illustrated a conventional form of gripping means for the sheets carried by each cylinder comprising diametrically disposed fingers 10 pivoted upon the cylinder at 11 and having the grooved heads 12 adapted to engage pins 13 that are fixed on the main frame, the grooves of the heads receiving the pins as the cylinders rotate, the pins being so spaced as to cause the fingers 10 to grip and release the sheets at proper intervals. Reciprocative rods 14 are pivotally connected to the heads 12 and slidable in bearing 16 secured on each printing cylinder and cooperative with a coil spring 17 connecting a corresponding rod, bearing against bearing 16 and collar 15 on the rod. As the cylinders rotate the grippers 10 will be caused to open, then to close to grip the edge portion of a sheet against the cylinder, and then to open to release the sheet after printing thereon. At 18, 19, 20 and 21 are indicated printing or numbering wheels having peripheral type and rotatively mounted in spaced relation, shown at 90° apart, upon a frame 22 secured upon shaft 23 journaled upon the main frame. Said shaft has a gear 24 in mesh with gear 7, whereby the numbering wheels will be bodily rotated in correspondence to the rotation of cylinder 9. Means are also provided for rotating the numbering wheels 18, 19, 20 and 21 on their axes to cause their peripheral printing numbers to be successively presented to the printing cylinder 9 for printing the page numbers on the sheets. For such purpose the shaft 23 is shown journaled at one end within a gear 25 whose hub 25*a* is journaled within bearing 1*a* of frame 1, (Fig. 10), and a gear 26 is secured to said hub for rotating gear 25. A gear 27 secured on shaft 8 meshes with gear 26 for rotating the latter and gear 25, (Fig. 13). The shafts 18*a*, 19*a*, 20*a* and 21*a* of the numbering wheels are provided with gears 28, 29, 30 and 31 respectively that mesh with the gear 25 disposed centrally thereof, whereby axial rotation of gear 25 will cause axial rotation of the numbering wheels through their corresponding gears, (Fig. 13). The ratio of gears 7 and 24 for rotating the frame 22 is at the same peripheral speed as the printing cylinder 9 and is not the same as the ratio of gears 26 and 27, but the latter have a ratio such that gear 25 will be rotated at slightly less speed than frame 22, in such a manner that when the gears 28, 29, 30 and 31 are rotated bodily around gear 25 the rotation of the latter will cause the numbering wheels to be rotated one step axially for presenting successive peripheral printing numbers thereof to the printing cylinder 9 for each bodily rotation of the frame 22. For instance, if gears 7 and 24 have forty-six teeth each the gear 26 may have forty-eight teeth, and the gear 27 may have fourty-four teeth. When gears 7 and 27 make one rotation the frame 22 will make one rotation and the gears 26 and 25 will make eleven-twelfths of one rotation, consequently forcing the gears 28, 29, 30 and 31, with the type wheels 18, 19, 20 and 21 at their periphery one-twelfth rotation ahead in the direction of rotation of frame 22, such one-twelfth rotation being the distance of the spacing between types for a forty-eight page book. For a book containing double the number of pages and numbers the gear 26 would have forty-eight teeth and the gear 27 would have forty-six teeth resulting in advancing the type a distance of one-twenty-fourth of a rotation, equal to the spacing of type for twice as many page numbers as for a forty-eight page book. At 32 and 33 are inking rolls of any suitable character adapted to apply printer's ink to the type on the peripheries of the numbering wheels as the latter rotate in contact with inking roll 32.

A table is indicated at 34 upon the main frame along which the sheets to be printed are fed manually to be gripped by the grippers 10 of the printing cylinder 9 for feeding the sheets successively between said printing cylinder and the numbering wheels. Since I have illustrated two grippers 10 on each printing cylinder it will be understood that two sheets will be fed for each rotation of the printing cylinder and that two successive numbering wheels will print on each sheet, so that the four numbering wheels illustrated will print appropriate numbers upon the front and rear corner portions of one face of two succeeding sheets for each rotation of frame 22.

To print page numbers on the corresponding corners of the opposite faces of the sheets, in a consecutive manner, I provide a second frame 35 shown disposed diagonally with respect to the printing cylinder 9 and opposing the cylinder 4, which frame is secured upon shaft 36 journaled on the main frame, which shaft is provided with a gear 37 in mesh with gear 6, (Fig. 12), for rotating said frame at the same speed as the printing cylinder 4. Frame 35 is provided with four equally spaced numbering wheels 38, 39, 40 and 41 that correspond in function with the numbering wheels 18, 19, 20 and 21 for printing on the appropriate faces of the sheets. The shafts 38a, 39a, 40a, and 41a of the numbering wheels 38, 39, 40 and 41 are respectively provided with gears 42, 43, 44 and 45 which mesh with a gear 46 concentric with shaft 36, which shaft 36 is provided with a gear 47 in mesh with gear 48 secured on shaft 5, (Fig. 13). The relation of the shaft 36 and the gears 46 and 47 is similar to that shown and described with respect to Figs. 9 and 10. The arrangement is such that when shaft 5 is rotated with the printing cylinder 4 the frame 35 will be correspondingly rotated to rotate the numbering wheels 38, 39, 40 and 41 bodily, and by means of the gears 48, 47, 46, 42, 43, 44 and 45 the said numbering wheels will be axially rotated. The ratio of gears 6 and 37 for rotating the frame 35 is at the same peripheral speed as the printing cylinder 4 but is not the same as the ratio of gears 46, 47 and 48, since the latter have a ratio such that gear 46 will be rotated at slightly less speed than frame 35 in such a manner that when the gears 42, 43, 44 and 45 are rotated bodily around gear 46 the rotation of the latter will cause the numbering wheels 38, 39, 40 and 41 to be rotated one step axially for presenting successive printing numerals thereof to the printing cylinder 4 for each bodily rotation of frame 35. The ratio described may be similar to that described with respect to the operation of the numbering wheels of frame 22, so that after a sheet travels from two numbering wheels of frame 22 and the printing cylinder 9 and thence travels with the printing cylinder 4 with respect to two numbering wheels of frame 35 two page numbers will be printed by the latter on the face opposite the page numbers printed by the numbering wheels of frame 22, and so on for each sheet to be printed with the page numbers in the order desired for producing similar page numbers in a signature on two pages that face each other.

A delivery roll is indicated at 49 adjacent to the lower portion of printing cylinder 4, the shaft 49a of which roll is provided with gear 50 in mesh with gear 6 for feeding the printed sheets to the receiving shelf 51 suitably supported on the main frame.

The arrangement of the numerals upon the peripheries of the numbering wheels, in order to print page numbers in accordance with the illustrations of Figs. 1 to 7, is shown developed in Figs. 14 and 15, each wheel having twelve annularly disposed numbers on its periphery. Assuming that the parts are in the position shown in Fig. 13, and that a sheet A is fed to the upper grippers 10, the rotation of printing cylinder 9 and frame 22, (in the direction of the arrows), will cause the passage of the sheet between the cylinder and numbering wheel 21, which will have a blank space presented to the sheet A for the front unnumbered page a for the signature, and further rotation of said cylinder and frame will carry said sheet along until numbering wheel 18 prints thereon the numeral 8, as indicated in Fig. 1. When the sheet reaches a gripper 10 of printing cylinder 4 it will be released from the gripper of cylinder 9 and grasped by said gripper of cylinder 4 and will be carried forward with cylinder 4 and the unnumbered face will be presented to the appropriate numbering wheel of frame 35. The sheet A will first be printed on said unnumbered face at a corner by said wheel with page numeral 1, as in Fig. 2, and the sheet will be printed in the rear corner on the said face with page numeral 7 by the succeeding lower numbering wheel. Assuming that the sheets are fed on table 34 as fast as the numbering wheels revolve bodily the next sheet B will first be printed in a corner with the page numeral 7 by numbering wheel 19, and as the sheet continues along it will be printed on the same face in the opposite corner with numeral 1 by printing wheel 20. Said sheet will be carried along and be engaged by the grippers of printing cylinder 4 and will be printed on the unnumbered face with page numeral 2 by the appropriate numbering wheel of frame 35, and will next be printed in the opposite corner on the said face with page numeral 6 by the succeeding numbering wheel of frame 35. After each numbering wheel has printed a page number on a sheet and during its bodily rotation with its frame 22 or 35, said wheel is slowly rotated by means of the gearing operative by gear 25 or 46 to present a succeeding printing number to printing position so that when sheet C is fed, immediately following sheet B, the page numerals 6 and 2 will be printed on one face by the appropriate upper numbering wheels, as in Fig. 1, and the page numerals 3 and 5 will be printed on the opposite face by the appropriate lower numbering wheels, (Fig. 12). Correspondingly the succeeding sheet D will be printed on one face by the appropriate upper numbering wheels with the page numerals 5 and 3, (Fig. 1), and will be printed on the opposite face by the appropriate lower printing wheels with the page numerals 4 and 4, (Fig. 2). If more than four sheets should be used in a signature the continuing printing of the page numerals will correspondingly be arranged.

Since I have illustrated four sheets for a signature it will be understood that the sheets printed, as so far described, will be assembled as shown in Fig. 3 in the signature, with page numerals 1 and 1 opposing, (Fig. 3); 2 and 2 opposing, (Fig. 4); 3 and 3 opposing, (Fig. 5); 4 and 4 opposing, (Fig. 6), and so on until the last page number eight on sheet A appears on the back of the sheet. By continuing the printing of sheets a second signature will be page numbered, as in Fig. 7, with its first page numeral 8 printed corresponding to the previously described blank space a of sheet A, and the page numerals will be correspondingly printed by the upper and lower numbering wheels so that duplicate numerals will appear on opposite pages of the signature, and so on for a desired number of signatures for a book.

While one set each of upper and lower numbering wheels may be used the capacity of the machine may be increased by providing each frame 22 or 35 with series of duplicate numbering wheels, indicated at 18b, 19b, etc., for the upper numbering wheels and correspondingly at 39b, 40b, etc., for the lower numbering wheels, and said frames are made adjustable along their corresponding shafts 23 or 36, as by means of sleeves 52 and 52a, (Figs. 9 and 12), carrying the frames, being slidably mounted upon shaft 23 or 36 and retained in adjusted position by suitable means, such as a screw 53. The gears 25 and 46 are of sufficient length so that the corresponding gears 28, 29, 30 and 31 will remain in mesh with the gear 25, and the gears 42, 43, 44 and 45 will remain in mesh with gear 46 in different positions of the corresponding frame.

The inking rolls 33 are sufficiently narrow and are so located with respect to the printing wheels that only one row of type on the latter will be inked at a time.

Only one series of the numbering wheels will be presented in printing position with respect to its printing cylinder at the same time, so that when all the numbers have been utilized on one set of printing wheels its frame will be shifted sideways to present the next set of printing wheels in printing position. The printing numerals on the peripheries of such wheels are arranged in proper sequence to print the page numerals in the order required for the signatures having similar page numerals for pages that face each other.

The machine described may be used for printing single books by using one set of numbering wheels throughout, the paper being just wide enough for the pages, or the machine may be used for printing pages for two books simultaneously by increasing the width of the paper and using the double set of numbering wheels, with appropriate inking rolls, the sheets to be subsequently split for duplicate pages. Since the type wheels each have two rows of type, such as one row for a forty-eight page book and the second row for a ninety-six page book, the larger books would require the setting of frame 22 as before stated, and the gears 26 and 27 would be replaced with gears having forty-eight and forty-six teeth respectively.

While I have illustrated and described a particular embodiment of my invention it will be understood that changes may be made, within the details of construction and relative arrangement of parts, and other classes of printing may be performed, without departing from the spirit of my invention.

Having now described my invention what I claim is:—

1. A machine of the character specified comprising two sets of numbering wheels having non-consecutive numerals, a rotative frame carrying each set of wheels for bodily rotation of the latter, means to rotate the wheels axially for presenting type successively to printing position, and means for impressing the type upon sheets, whereby a sheet will be printed with non-consecutive numerals by one or more wheels of one set on one face and by one or more wheels of the other set on a different face.

2. A machine of the character specified comprising a printing cylinder, a plurality of numbering wheels cooperative therewith having permanent numerals in non-consecutive sequence on their peripheries including individual numbers for each page to print non-consecutive numerals, means rotatively carrying the numbering wheels for bodily rotation, said wheels being journaled for axial rotation, means to rotate said wheels a space from type to type for each bodily rotation thereof, a second printing cylinder adjacent to the first named printing cylinder to receive sheets therefrom, a plurality of numbering wheels cooperative with the second printing cylinder having permanent numerals in non-consecutive sequence on their peripheries including individual numbers for each page to print non-consecutive numerals, means rotatively carrying the second named numbering wheels for bodily rotation, said wheels being journaled for axial rotation, and means to rotate said wheels a space from type to type for each bodily rotation thereof, the first named wheels being in position to print on one side of a sheet and the second named wheels being in position to print upon the opposite side of said sheet.

JAMES H. REINHARDT.